(12) United States Patent
Lankinen

(10) Patent No.: US 9,518,688 B2
(45) Date of Patent: Dec. 13, 2016

(54) EXPANSION JOINT IN A VERTICAL CHANNEL

(71) Applicant: FOSTER WHEELER ENERGIA OY, Espoo (FI)

(72) Inventor: Pentti Lankinen, Varkaus (FI)

(73) Assignee: AMEC FOSTER WHEELER ENERGIA OY, Espoo (FI)

( * ) Notice: Subject to any disclaimer, the term of this patent is extended or adjusted under 35 U.S.C. 154(b) by 320 days.

(21) Appl. No.: 14/365,162

(22) PCT Filed: Jan. 7, 2013

(86) PCT No.: PCT/FI2013/050012
§ 371 (c)(1),
(2) Date: Jun. 13, 2014

(87) PCT Pub. No.: WO2013/104824
PCT Pub. Date: Jul. 18, 2013

(65) Prior Publication Data
US 2014/0326353 A1    Nov. 6, 2014

(30) Foreign Application Priority Data
Jan. 12, 2012    (FI) ..................................... 20125033

(51) Int. Cl.
*E03B 7/10*    (2006.01)
*F16L 27/08*   (2006.01)
(Continued)

(52) U.S. Cl.
CPC .......... *F16L 27/0808* (2013.01); *F16L 51/021* (2013.01); *F23C 10/18* (2013.01);
(Continued)

(58) Field of Classification Search
USPC ...... 138/121, 109, 28; 285/57, 145.1, 145.5, 285/227, 300
See application file for complete search history.

(56) References Cited

U.S. PATENT DOCUMENTS 2,437,385 A * 3/1948 Halford ..................... F23R 3/48
                                                  285/121.1
3,068,026 A * 12/1962 McKamey ............ F16L 39/005
                                                  285/123.1
(Continued)

FOREIGN PATENT DOCUMENTS

CN    2589423 Y    12/2003
DE    2410341 A1    9/1975
(Continued)

OTHER PUBLICATIONS

Notification of and International Preliminary Report on Patentability, including the Written Opinion, mailed Jul. 24, 2014, in corresponding International Patent Application No. PCT/FI2013/050012.
(Continued)

*Primary Examiner* — James Hook
(74) *Attorney, Agent, or Firm* — Fitzpatrick, Cella, Harper & Scinto

(57) ABSTRACT

An expansion joint in a vertical channel suitable for conducting hot particles. The expansion joint includes an upper channel portion including a lower end portion with a lower edge. A lower channel portion is sealingly connected by a flexible element connected on an outer side of the vertical channel. The lower channel portion includes an upper end portion with a horizontally extending upper plane. In a predetermined vertical level range, the upper end portion telescopically overlaps the lower end portion in a spaced relationship, to permit relative axial and lateral movements of the upper channel portion and the lower channel portion, whereby the upper plane is at a higher level than the lower (Continued)

edge. A sealing ring, including mutually connected sealing blocks positioned on an outer circumference of the lower end portion, is arranged on the upper plane.

15 Claims, 4 Drawing Sheets

(51) Int. Cl.
F23J 13/04 (2006.01)
F23C 10/18 (2006.01)
F16L 51/02 (2006.01)

(52) U.S. Cl.
CPC .......... *F23J 13/04* (2013.01); *F23J 2213/204* (2013.01); *Y10T 29/49826* (2015.01)

(56) References Cited

U.S. PATENT DOCUMENTS

| | | | |
|---|---|---|---|
| 3,254,910 A * | 6/1966 | Poole | F16L 51/021 |
| | | | 285/114 |
| 3,812,771 A * | 5/1974 | Yokoyama | E04H 12/28 |
| | | | 454/1 |
| 4,063,755 A | 12/1977 | Merz | |
| 4,332,404 A * | 6/1982 | Huffman | F16L 27/04 |
| | | | 285/223 |
| 4,576,404 A * | 3/1986 | Weber | F16L 51/02 |
| | | | 285/226 |
| 4,919,198 A | 4/1990 | Patron | |
| 5,366,255 A | 11/1994 | Garkawe | |
| 5,383,316 A | 1/1995 | Burke et al. | |
| 5,560,166 A | 10/1996 | Burke et al. | |
| 8,833,801 B2 | 9/2014 | De Temple | |
| 2006/0081302 A1* | 4/2006 | Taira | F01N 13/14 |
| | | | 138/118 |
| 2007/0181204 A1* | 8/2007 | Stout | F16L 59/147 |
| | | | 138/149 |

FOREIGN PATENT DOCUMENTS

| | | |
|---|---|---|
| DE | 8811295 U1 | 10/1988 |
| EP | 2402642 A1 | 1/2012 |
| FI | 900242 A | 7/1991 |
| FI | 9485 U1 | 11/2011 |

OTHER PUBLICATIONS

Chinese Official Action dated Oct. 26, 2015, issued in corresponding Chinese Patent Application No. 201380005355.3.
Finnish Office Action dated Oct. 12, 2013, issued in corresponding Finnish Patent Application No. 20125033.
Notification of and International Search Report dated Apr. 8, 2013, and mailed Apr. 16, 2013, in corresponding International Application No. PCT/FI2013/050012.
Written Opinion mailed Apr. 16, 2013, in corresponding International Application No. PCT/FI2013/050012.

* cited by examiner

EXPANSION JOINT IN A VERTICAL CHANNEL

CLAIM OF PRIORITY

This application is a U.S. national stage application of PCT International Application No. PCT/FI2013/050012, filed Jan. 7, 2013, published as International Publication No. WO 2013/104824 A1, and which claims priority from Finnish patent application number 20125033, filed Jan. 12, 2012.

FIELD OF THE INVENTION

The present invention relates to an expansion joint in a vertical channel for conducting hot particles, and to a method of making an expansion joint in a vertical channel for conducting hot particles. The invention is especially directed for use in a channel for conducting high temperature particulate material in connection with a particle separator of a circulating fluidized bed reactor.

BACKGROUND OF THE INVENTION

It is commonly known that differential thermal expansions between components of a reactor have to be taken into account in order to avoid damage that may occur when the temperature of the reactor is changed. A common practice is to divide each channel connecting such components in separate upstream and downstream parts to allow relative movement of the components due to differential thermal expansion. In order to maintain the channel sealed, the upstream and downstream parts are connected by an air-tight flexible means, such as fabric or metal bellows. An expansion joint with fabric bellows is commonly used when relatively large movements or movements both in the axial and the lateral directions are expected.

High temperature expansion joints that are capable of handling relatively large thermal movements are often required in channels connected to the particle separator of a circulating fluidized bed (CFB) boiler. A problem is that fabric bellows cannot withstand the high temperatures of the gas and particles flowing through the particle separator. Moreover, particles packing between the moving parts of the joint may prevent the movement, and thereby cause breakage of the joint.

U.S. Pat. No. 5,366,255 discloses a high temperature expansion joint arranged between two portions of a channel. In the area of the joint, one of the channel portions telescopically overlaps the other channel portion in a spaced relationship to permit relative axial and lateral movements of the channel portions. Each channel portion comprises an outwardly extending extension, which outwardly extending extensions are sealingly connected with a composite fabric belt dimensioned to permit the relative movements. Thermal insulation is disposed between the outwardly extending extensions to inhibit heat flow to the fabric belt. A drawback in the joint is that the thermal insulation may be irreversibly tightened in repeated compressions, so that particulate material is allowed to pack into the joint, and damage the fabric belt, or prevent the movements of the joint.

Finnish Patent No. 87271 discloses a high temperature expansion joint between an upstream portion and a downstream portion of a channel, which are sealingly connected by a flexible element connected on the outer side of the channel. The joint comprises intermediate elements that are connected in the downstream channel portion in a way that allows axial, but not lateral movement, of the intermediate elements. The intermediate elements are supported by a spring against a transverse plane of the upstream channel portion and comprise a downstream end arranged to slide on an inner circumference of the downstream channel portion. A drawback of this expansion joint is that at least when the system is used at a temperature lower than its highest operating temperature, the inner circumference of the downstream channel portion, on which the intermediate element fits in a high temperature operation, is directly accessible to abrasive forces due to particles flowing in the channel. Therefore, the construction has a risk of wearing of the sliding surface on the inner circumference of the downstream channel portion in start-up and close-down phases of a fluidized bed boiler. Moreover, the maintenance of the expansion joint is complicated, inasmuch as it can only be done inside the channel.

Finnish Utility Model No. 20110203, now Finnish Patent Document No. FI 9485, discloses a high temperature expansion joint that differs from that in Finnish Patent No. 87271, mainly in that axial extensions of the intermediate elements, which elements are movably connected to a first channel portion, are arranged to slide on an outer circumference of the first channel portion. Moreover, the intermediate elements are in the case of a vertical channel supported against a transverse end plane of the second channel portion by gravitation only. A drawback of this expansion joint is that at least when the system is used at a temperature lower than its highest operating temperature, the sliding surface of the axial extensions of the intermediate elements, on which the first channel portion fits in high temperature operation, is directly accessible to abrasive forces due to particles flowing in the channel. Therefore, the construction has a risk of wearing of the sliding surface on the axial extension of the intermediate elements in start-up and close-down phases of a fluidized bed boiler.

SUMMARY OF THE INVENTION

An object of the present invention is to provide a high temperature expansion joint and a method of making a high temperature expansion joint by which the above mentioned drawbacks of the prior art are minimized.

In order to obtain at least some of the objects mentioned above, the invention provides an expansion joint in a vertical channel for conducting hot particles, the channel comprising an upper channel portion and a lower channel portion sealingly connected by a flexible element connected on the outer side of the vertical channel, wherein the upper channel portion comprises a lower end portion with a lower edge and the lower channel portion comprises an upper channel portion with a horizontally extending upper plane. The expansion joint is specifically characterized in that, in a predetermined vertical level range, the upper end portion telescopically overlaps the lower end portion in a spaced relationship to permit relative axial and lateral movements of the upper and lower channel portions, whereby the upper plane is at a higher level than the lower edge, and a sealing ring comprising mutually connected sealing blocks positioned on an outer circumference of the lower end portion is arranged on the upper plane.

An advantage of the present invention is that, because the sealing ring is arranged on the horizontally extending upper plane of the upper end portion, which is at a higher level than the lower edge of the upper channel portion, the sealing blocks are not directly accessible to abrasive forces due to particles flowing in the channel. Thereby, the lower end portion protects in all circumstances the sealing ring from wearing due to the particle flow in the channel.

The sealing blocks are preferably made of a suitable ceramic material. The sealing blocks preferably have a flat bottom surface, and the sealing ring is arranged to be held on the horizontally extending upper plane of the upper end portion by gravitation. The sealing ring is formed of sealing blocks to seal the upper plane so as to prevent particles from entering from the channel to the space behind the sealing ring. Correspondingly, the sealing blocks preferably have a smooth side face to be mounted against an outer circumference at the lower end portion. The inner circumference of the sealing ring is advantageously made to relatively closely fit on an outer circumference of the lower end portion. Thereby, the sealing ring also seals the lower end portion so as to prevent particles from escaping from the channel upwards to the space outside the sealing ring.

Thereby, between each sealing block of the sealing ring and the horizontally extending upper plane is arranged a horizontal sliding surface so as to allow relative horizontal movement between the sealing ring and the horizontally extending upper plane. In practice, when differential thermal expansions cause relative horizontal movement between the upper and lower channel portions, the sealing ring moves together with the lower end portion of the upper channel portion, and slides on the upper plane of the upper end portion of the lower channel portion.

Correspondingly, when differential thermal expansions cause relative vertical movement between the upper and lower channel portions, the sealing ring moves together with the upper end portion of the lower channel portion, and slides on an outer circumference of the lower end portion of the upper channel portion. Therefore, between each sealing block of the sealing ring and the outer circumference of the lower end portion of the upper channel portion, there is a vertical sliding surface that allows relative vertical movement between the sealing ring and the lower end portion of the upper channel portion.

As another aspect, the present invention provides a method of forming an expansion joint in a vertical channel for conducting hot particles comprising an upper channel portion and a lower channel portion, wherein the upper channel portion comprises a lower end portion with a lower edge and the lower channel portion comprises an upper channel portion with a horizontally extending upper plane. The method includes the steps of arranging the upper and lower channel portions so that, in a predetermined vertical level range, the upper end portion telescopically overlaps the lower end portion in a spaced relationship to permit relative axial and lateral movements of the upper and lower channel portions, whereby the upper plane is at a higher level than the lower edge, forming a sealing ring on the horizontally extending upper plane by arranging mutually connected sealing blocks on an outer circumference of the lower end portion, and thereafter, sealingly connecting the upper channel portion and the lower channel portion by connecting a flexible element on the outer side of the vertical channel.

Advantageously, a space limited at least by the horizontally extending extensions and the ring of mutually connected sealing blocks, so-called a sealing space, is at least partially filled by insulating material before the step of connecting the upper channel portion and the lower channel portion by the flexible element.

An advantage of the method according to the present invention is that the expansion joint, especially, the sealing ring thereof, can be made and maintained at the outside of the channel.

Preferably, the seal between the upper and lower channel portions is made so that the upper and lower channel portions comprise an outwardly extending extension, which outwardly extending extensions are sealingly connected by the flexible element, such as a fabric bellows. Advantageously, the space limited at least by the fabric bellows, the horizontally extending extensions and the sealing ring, the sealing space, is at least partially filled by insulating material, such as insulating wool.

Advantageously, the space limited at least by the fabric bellows, the horizontally extending extensions and the ring of mutually connected sealing blocks, the sealing space, is pressurized by a gas. Thereby, the pressurizing gas causes a continuous, relatively small flow of gas from the sealing space towards the channel, and thus further minimizes the risk of particles packing into the sealing space. The pressurizing gas can be, for example, air or exhaust gas.

According to a preferred embodiment of the present invention, adjacent sealing blocks of the sealing ring are mutually connected by steel plates. The seal blocks may advantageously comprise upright pins, and the steel plates, with corresponding holes, can be mounted by laying them to be connected by the pins. Advantageously, adjacent sealing blocks of the sealing ring are partially overlapping so as to prevent, or at least minimize, the possibility of escaping of particles from the channel upwards between the sealing blocks to the sealing space.

An expansion joint according to the present invention can advantageously be used in a circulating fluidized bed (CFB) boiler, especially, in vertical connecting channels of the particle separator of a CFB boiler. The lower end of such a particle separator is connected to a return duct leading an intense stream of separated particles to the lower portion of the furnace of the CFB boiler. Due to the constructions of the particle separator and the return duct, differential thermal expansions may cause relatively large horizontal and vertical relative movements between the particle separator and the return duct. An expansion joint according to the present invention is, therefore, advantageously arranged in a channel leading from the particle separator to the return duct. Correspondingly, the upper end of the particle separator is connected to an exhaust gas channel, which also still carries some fly ash. Thus, an expansions joint according to the present invention also can be advantageously arranged in a vertical channel leading flue gas and fly ash from the particle separator to the exhaust gas channel.

BRIEF DESCRIPTION OF THE DRAWINGS

The above brief description, as well as further objects, features, and advantages of the present invention will be more fully appreciated by reference to the following detailed description of the currently preferred, but nonetheless illustrative, embodiments in accordance with the present invention, when taken in conjunction with the accompanying drawings, wherein.

DETAILED DESCRIPTION OF THE PREFERRED EMBODIMENTS

Figure 1:
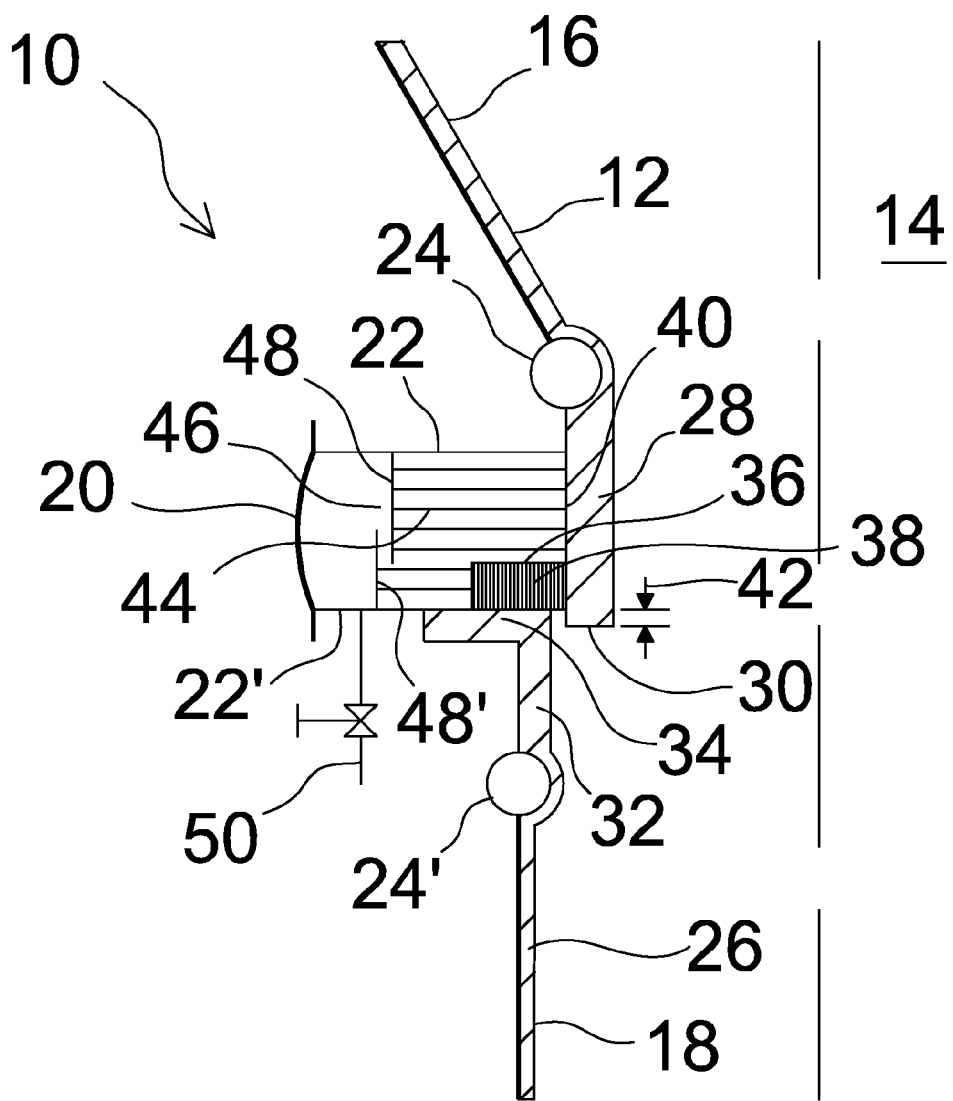
FIG. 1 is a schematic vertical cross section of a portion of a vertical channel comprising an expansion joint according to the present invention.

FIG. 1 shows schematically an expansion joint 10 arranged in the wall 12 of a channel 14. The channel comprises an upper channel portion 16 and a lower channel portion 18, which are sealed to be airtight by a fabric bellows 20 attached to outwardly extending extensions 22, 22' of the upper and lower channel portions. The channel of FIG. 1 is water cooled (as can be seen by the horizontal water distributors 24, 24'), but in other embodiments, the channel can also be uncooled. The upper and lower channel portions are advantageously covered by a layer of refractory 26.

The upper channel portion 16 comprises a lower end portion 28 with a lower edge 30 and the lower channel portion 18 comprises an upper end portion 32 with a horizontally extending upper plane 34. A sealing ring 36 formed of mutually connected sealing blocks 38 is arranged on the horizontally extending upper plane 34. The sealing ring 36 is held by gravitation against the upper plane 34. The sealing ring 36 is also arranged to relatively closely fit on an outer circumference 40 of the lower end portion 28 of the upper channel portion 16.

The upper end portion 32 of the lower channel portion 18 telescopically partially overlaps the lower end portion 28 of the upper channel 16 portion in a spaced relationship. The upper and lower channel portions are arranged relative to each other so as to permit the relative axial and lateral movements due to possible differential thermal expansions. The amount of overlapping 42 between the upper and lower channel portions depends on temperature, but the channel portions are arranged so that, in all conditions, the upper plane 34 is at a higher level than the lower edge 30.

The space limited by the lower end portion 28, the sealing ring 36, the upper plane 34, the outwardly extending extensions 22, 22', and the fabric bellows 20, the so-called sealing space 46, is advantageously at least partially filled with insulating wool 44. The insulation wool provides the ability to keep the fabric bellows 20 at a temperature below its maximum operating temperature. It also prevents hot particulate material that may penetrate between the sealing blocks 38 or between the sealing blocks and the lower end portion 28 from entering further into the sealing space 46. The space filled with the insulating wool may be further limited by suitable means, such as plates or nests 48, 48' attached to the outwardly extending extensions 22, 22'. The plates 48, 48' are preferably connected to the extensions 22, 22' by bolts or by another easily removable way. Thereby, the insulating wool and the sealing blocks can be checked and possibly changed at the outside of the channel 14.

The sealing space 46 may advantageously be equipped by means 50 for pressurizing the sealing space, for example, by air or flue gas. The sealing space 46 is usually not airtight with respect to the channel 14, and the pressurization gives rise to a flow of gas from the sealing space to the channel 14. This relatively small flow of gas guarantees that particulate matter does not pack from the channel 14 to the sealing space 46. The use of pressurizing gas also helps to keep the fabric bellows at a relatively low temperature.

Figure 2:
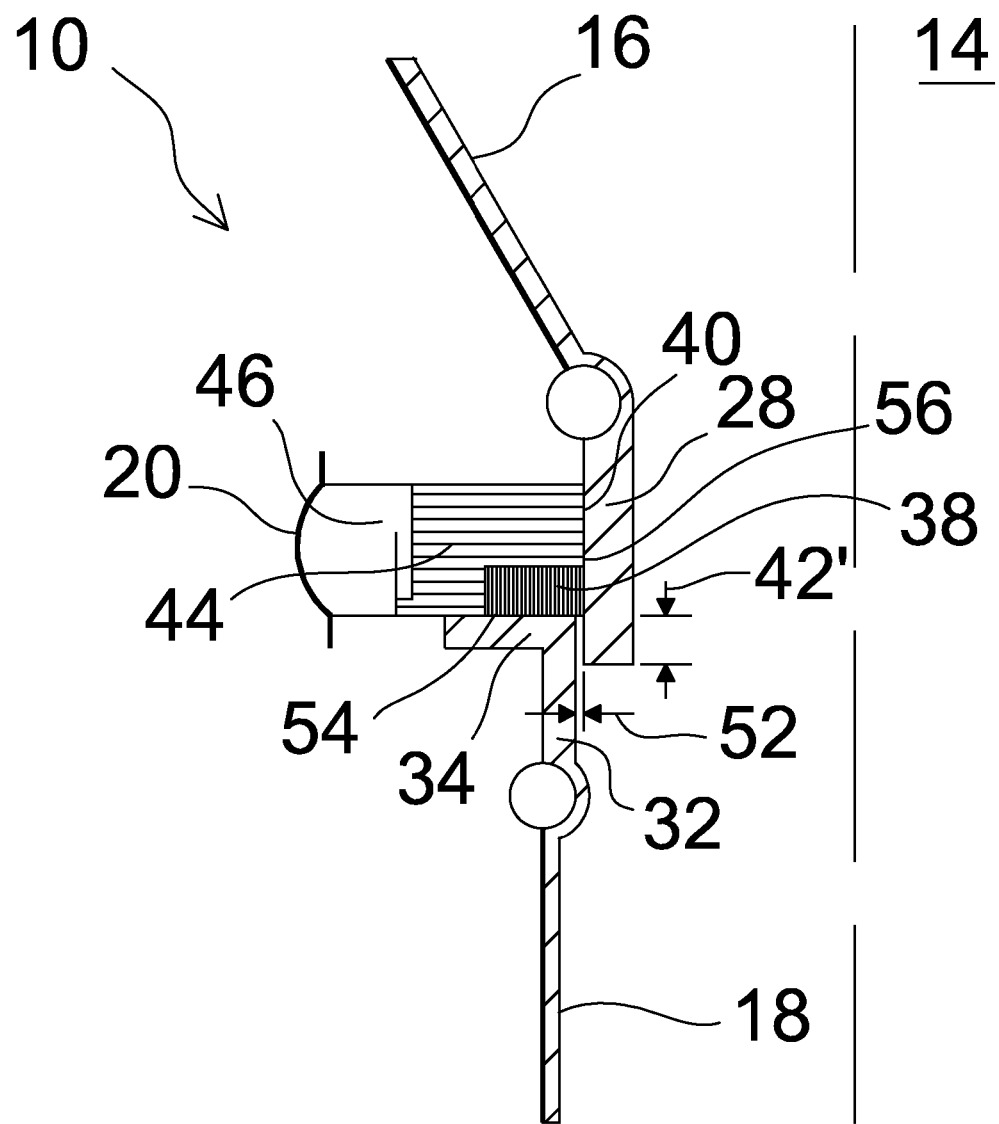
FIG. 2 is another schematic vertical cross section of a portion of a vertical channel comprising an expansion joint according to the present invention.

FIG. 2 shows the same expansion joint 10 as in FIG. 1, but at another temperature. The upper channel portion 16 is supported, for example, so that at a higher temperature, shown in FIG. 2, it moves vertically closer to the lower channel portion 18. Thus, the overlap 42' between the upper channel portion and the lower channel portion shown in FIG. 2 is larger than the corresponding overlap 42 shown in FIG. 1.

At the same time, there may be relative horizontal movement between the upper channel portion 16 and the lower channel portion 18. In FIG. 2, the upper channel portion 16 is moved left relative to the lower channel portion 18, as compared to the situation shown in FIG. 1. Thus, the gap 52 between the lower end 28 and upper end 32 is less than the corresponding gap in FIG. 1. Because of the relative movements shown in FIG. 2, the fabric bellows 20 is bent outwards, and the insulating wool 44 is compressed, as compared to the arrangement shown in FIG. 1.

In the situation of FIG. 2, the sealing blocks 38 have slid horizontally on the horizontal sliding surface 54 of the upper plane 34 and vertically on the vertical sliding surface 56 on the inner circumference 40 of the lower channel portion 28. While the sealing blocks 38 remain in all temperatures in contact with the upper plane 34 and the lower end portion 28, particulate matter cannot enter from the channel 12 to the sealing space 46.

Figure 3:
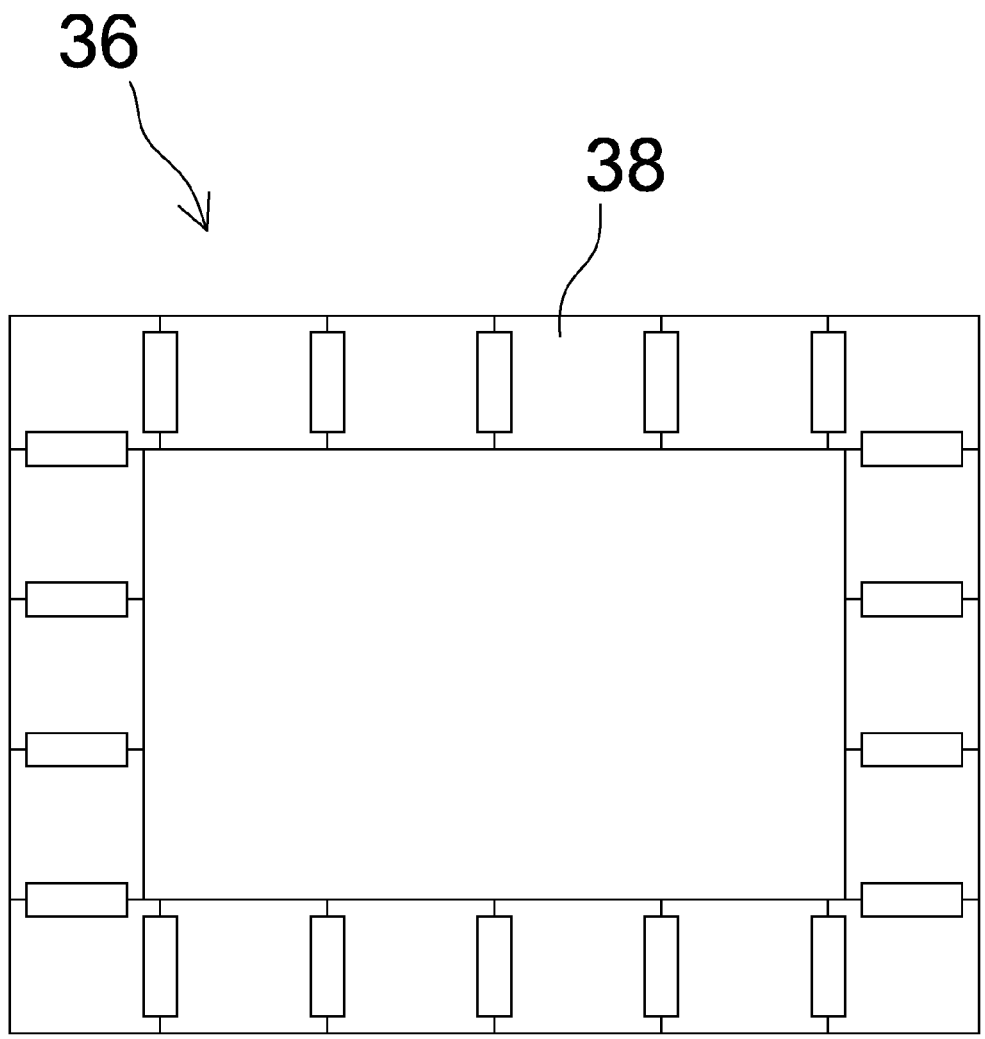
FIG. 3 is a schematic plan view of a sealing ring of an expansion joint according to the present invention.

FIG. 3 shows a plan view of the sealing ring 36 formed of mutually connected ceramic sealing blocks 38. As described in connection with FIGS. 1 and 2, the sealing ring is arranged on the upper plane of the upper end portion of the lower channel portion and on an outer circumference of the lower end portion of the upper channel portion. (The upper and lower channel portions are, however, not shown in FIG. 3.) As indicated by the form of the sealing ring in FIG. 3, the upper and lower channel portions preferably have a rectangular cross section. It is also possible, however, to have upper and lower channel portions with another type of a cross section, such as a circular cross section. In such cases, the sealing blocks are modified to form a sealing ring corresponding to the cross section of the upper channel portion.

The size of the sealing blocks can be varied. The sealing ring can be formed of only a small number, such as four, sealing blocks. Preferably, however, the sealing blocks are made relatively small to keep the handling of the blocks easier. Therefore, the sealing ring is preferably formed of at least 10 to 20 sealing blocks. Typically, the sealing blocks have a height of about 5 cm to about 10 cm, and horizontal dimensions from about 10 cm to about 50 cm.

Figure 4A:
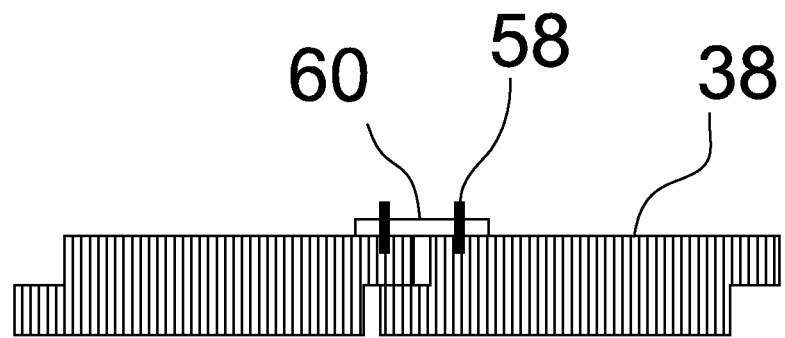
FIGS. 4a and 4b are a schematic vertical cross section and a schematic plan view of two adjacent sealing blocks of an expansion joint according to the present invention.
Figure 4B:
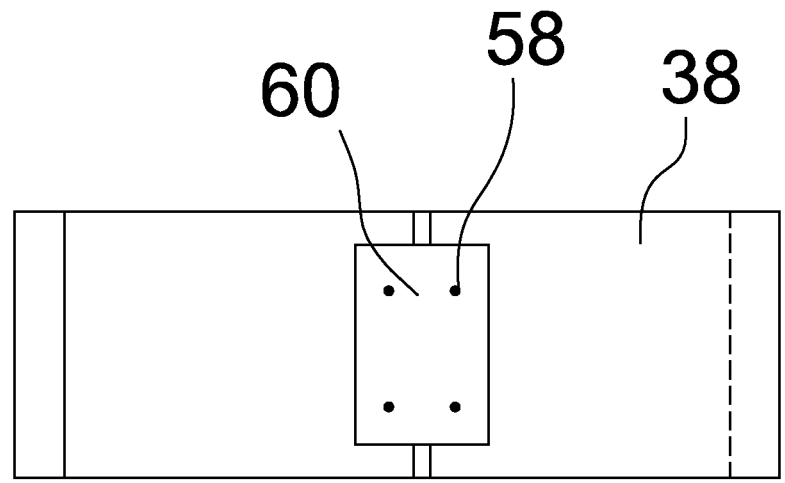

FIGS. 4a and 4b show a vertical cross section and a plan view of two adjacent sealing blocks 38 of a sealing ring. According to this embodiment, adjacent sealing blocks are formed to partially overlap, so as to prevent particle flow upwards between the blocks.

Adjacent sealing blocks 38 are preferably mutually connected together to maintain the form of the sealing ring when relative movements between the components of the system take place. FIGS. 4a and 4b show an advantageous method to connect adjacent sealing blocks 38. According to this method, each sealing block includes metal pins 58 cast into the block. Steel plates 60 with corresponding holes are then placed in the pins to form a rigid sealing ring.

An advantage of the present expansion joint is that it can stay in good operating conditions in the start-up, operating, and close-down phases of a circulating fluidized bed boiler. More particularly, this means that, at most, a small amount of particulate material penetrates into the sealing space 46, and wearing of the sealing ring 36 and sliding surfaces 54, 56 is minimized. Therefore, the need for frequent replacing and cleaning of parts of the expansion joint is avoided. Moreover, when cleaning or replacing parts of the expansion joint is desired, it can easily be made from the outside of the vertical channel 14. This can be done by first removing the fabric bellows 20 and possibly insulation holding means 48, 48', whereafter the insulation wool and sealing blocks can be maintained and, if needed, replaced.

While the invention has been described herein by way of examples in connection with what are at present considered to be the most preferred embodiments, it is to be understood that the invention is not limited to the disclosed embodiments, but is intended to cover various combinations or modifications of its features and several other applications included within the scope of the invention as defined in the appended claims.

What is claimed is:

1. An expansion joint in a vertical channel suitable for conducting hot particles, the expansion joint comprising:
    an upper channel portion, the upper channel portion comprising a lower end portion with a lower edge;
    a lower channel portion sealingly connected by a flexible element connected on an outer side of the vertical channel, the lower channel portion comprising an upper end portion with a horizontally extending upper plane, wherein, in a predetermined vertical level range, the upper end portion telescopically overlaps the lower end portion in a spaced relationship, to permit relative axial and lateral movements of the upper channel portion and the lower channel portion, whereby the upper plane is at a higher level than the lower edge; and
    a sealing ring arranged on the upper plane so as to be held by gravitation against the upper plane, the sealing ring comprising sealing blocks positioned on an outer circumference of the lower end portion, the sealing blocks being mutually connected together so as to maintain the form of the sealing ring when relative movements between the upper channel portion and the lower channel portion take place.

2. The expansion joint according to claim 1, wherein, between each sealing block of the sealing ring and the horizontally extending upper plane, is a horizontal sliding surface so as to allow relative horizontal movement between the sealing ring and the horizontally extending upper plane, and between each sealing block of the sealing ring and the outer circumference of the lower end portion is a vertical sliding surface so as to allow relative vertical movement between the sealing ring and the lower end portion.

3. The expansion joint according to claim 1, wherein each of the upper channel portion and the lower channel portion comprises an outwardly extending extension, which outwardly extending extensions are sealingly connected by the flexible element.

4. The expansion joint according to claim 3, wherein the flexible element is a fabric bellows.

5. The expansion joint according to claim 4, wherein a space limited at least by the fabric bellows, the horizontally extending extensions, and the sealing ring is at least partially filled by insulating material.

6. The expansion joint according to claim 5, wherein the insulating material is insulating wool.

7. The expansion joint according to claim 4, wherein a space limited at least by the fabric bellows, the horizontally extending extensions, and the sealing ring is pressurized.

8. The expansion joint according to claim 1, wherein adjacent sealing blocks of the sealing ring are mutually connected by steel plates.

9. The expansion joint according to claim 1, wherein adjacent sealing blocks of the sealing ring are partially overlapping.

10. A circulating fluidized bed boiler comprising:
    an expansion joint according to claim 1.

11. A method of forming an expansion joint in a vertical channel suitable for conducting hot particles, the expansion joint comprising (i) an upper channel portion, the upper channel portion comprising a lower end portion with a lower edge, and (ii) a lower channel portion, the lower channel portion comprising an upper end portion with a horizontally extending upper plane, the method comprising the steps of:
    (a) arranging the upper channel portion and the lower channel portion so that, in a predetermined vertical level range, the upper end portion telescopically overlaps the lower end portion in a spaced relationship, to permit relative axial and lateral movements of the upper channel portion and the lower channel portion, whereby the upper plane is at a higher level than the lower edge;
    (b) arranging a sealing ring, on the horizontally extending upper plane, so as to be held by gravitation against the upper plane, the sealing ring comprising sealing blocks positioned on an outer circumference of the lower end portion, the sealing blocks being mutually connected together so as to maintain the form of the sealing ring when relative movement between the upper channel portion and the lower channel portion take place; and
    (c) thereafter, sealingly connecting the upper channel portion and the lower channel portion by connecting a flexible element on the outer side of the vertical channel.

12. The method of forming an expansion joint according to claim 11, wherein the flexible element is a fabric bellows connected to outwardly extending extensions of the upper channel portion and the lower channel portion.

13. The method of forming an expansion joint according to claim 12, further comprising filling a space limited at least by the horizontally extending extensions and the ring of mutually connected sealing blocks at least partially by insulating material, before the step of connecting the upper channel portion and the lower channel portion by the fabric bellows.

14. The method of forming an expansion joint according to claim 12, further comprising pressurizing a space limited at least by the fabric bellows, the horizontally extending extensions, and the ring of mutually connected sealing blocks.

15. The method of forming an expansion joint according to claim 13, further comprising forming the ring of mutually connected sealing blocks by connecting adjacent sealing blocks by steel plates.

* * * * *